(12) United States Patent
Abuelsaad et al.

(10) Patent No.: US 11,985,183 B2
(45) Date of Patent: May 14, 2024

(54) AUTOMATIC INFORMATION EXCHANGE BETWEEN PERSONAL ELECTRONIC DEVICES UPON DETERMINATION OF A BUSINESS SETTING

(71) Applicant: INTERNATIONAL BUSINESS MACHINES CORPORATION, Armonk, NY (US)

(72) Inventors: Tamer E. Abuelsaad, Somers, NY (US); James E. Bostick, Cedar Park, TX (US); John M. Ganci, Jr., Cary, NC (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 16/690,356

(22) Filed: Nov. 21, 2019

(65) Prior Publication Data

US 2020/0092350 A1 Mar. 19, 2020

Related U.S. Application Data

(63) Continuation of application No. 15/005,631, filed on Jan. 25, 2016, now Pat. No. 10,764,356.

(51) Int. Cl.
*H04L 67/06* (2022.01)
*H04L 51/02* (2022.01)
(Continued)

(52) U.S. Cl.
CPC .............. *H04L 67/06* (2013.01); *H04L 51/04* (2013.01); *H04L 67/10* (2013.01); *H04L 67/12* (2013.01);
(Continued)

(58) Field of Classification Search
CPC . G06F 1/16; G06F 1/1694; G06F 3/01; G06F 3/011; G06F 3/014; G06F 3/015;
(Continued)

(56) References Cited

U.S. PATENT DOCUMENTS 6,711,414 B1   3/2004   Lightman et al.
8,090,359 B2 *  1/2012   Proctor, Jr. .......... G06Q 20/384
                                                   455/414.3
(Continued)

FOREIGN PATENT DOCUMENTS

WO   WO 2015094220   6/2015

OTHER PUBLICATIONS

Ma, Di et al. "Location-Aware and Safer Cards: Enhancing RFID Security and Privacy via Location Sensing." IEEE Trans. Dependable Secur. Comput. 10: 57-69. (Year: 2013).*

(Continued)

*Primary Examiner* — John M Macilwinen
(74) *Attorney, Agent, or Firm* — Robert Aragona; George S. Blasiak; Heslin Rothenberg Farley & Mesiti P.C.

(57) ABSTRACT

Methods, systems, and computer program products includes, for example, detecting a first personal electronic device associated with a first user in the presence of a second personal electronic device associated with a second user, determining the first personal electronic device in the presence of the second personal electronic device being associated with the first user and the second user being in a business setting, receiving user data regarding the second user in response to the determination of the first user and the second user being in the business setting, and storing the received user data regarding the second user in a first memory for access by the first user on the first personal electronic device.

20 Claims, 8 Drawing Sheets

(51) Int. Cl.
  *H04L 51/04* (2022.01)
  *H04L 67/10* (2022.01)
  *H04L 67/12* (2022.01)
  *H04L 67/125* (2022.01)
  *H04L 67/52* (2022.01)

(52) U.S. Cl.
  CPC ............ *H04L 67/125* (2013.01); *H04L 67/52* (2022.05); *H04L 51/02* (2013.01)

(58) Field of Classification Search
  CPC .......... G06F 3/016; G06F 3/017; G06F 3/038; G06F 3/0338; G06F 3/0481; G06F 3/0488; G06F 3/03543; G06F 3/04883; G06F 13/00; G06F 2203/04807; G09G 3/3648; G09G 3/3688; G09G 3/3696; G09G 2330/02; G09G 2330/021; G06Q 10/10; H04L 12/58; H04L 12/581; H04L 29/06; H04L 29/08; H04L 29/06027; H04L 29/08027; H04L 51/02; H04L 51/04; H04L 51/22; H04L 67/00; H04L 67/06; H04L 67/10; H04L 67/12; H04L 67/18; H04L 67/125; H04L 67/02; H04M 1/725; H04M 1/7253; H04M 1/72569; H04M 2250/64; H04M 1/72412; H04M 1/72448; H04M 1/72454; H04M 2250/04; H04W 4/21
  USPC .................... 345/156, 211; 709/204; 715/863
  See application file for complete search history.

(56) References Cited

U.S. PATENT DOCUMENTS

| | | | |
|---|---|---|---|
| 8,407,279 B2 | 3/2013 | Kang | |
| 8,463,182 B2 | 6/2013 | Mallinson | |
| 8,565,676 B2 | 10/2013 | Gormley | |
| 8,918,050 B2 | 12/2014 | Gormley | |
| 9,013,300 B2 | 4/2015 | Felix et al. | |
| 2010/0030740 A1* | 2/2010 | Higgins | H04W 4/024 707/E17.014 |
| 2011/0175879 A1 | 7/2011 | Tanaka | |
| 2011/0211534 A1 | 9/2011 | Schmidt et al. | |
| 2014/0057589 A1* | 2/2014 | Velusamy | H04W 64/00 455/404.2 |
| 2014/0148094 A1 | 5/2014 | Park et al. | |
| 2014/0171133 A1* | 6/2014 | Stuttle | G06F 16/9537 455/466 |
| 2014/0250181 A1 | 9/2014 | Proud et al. | |
| 2014/0365979 A1 | 12/2014 | Yoon | |
| 2014/0368336 A1 | 12/2014 | Felix et al. | |
| 2016/0109958 A1 | 4/2016 | Moon | |
| 2017/0038847 A1* | 2/2017 | Schorsch | G06F 3/017 |
| 2017/0041296 A1* | 2/2017 | Ford | G06F 16/951 |
| 2017/0214733 A1 | 7/2017 | Abuelsaad et al. | |

OTHER PUBLICATIONS

Wu, Xiaotao and Henning Schulzrinne. "Location-based services in Internet telephony." Second IEEE Consumer Communications and Networking Conference, 2005. CCNC. 2005: 331-336. (Year: 2005).*
Non-Final Office action, U.S. Appl. No. 15/005,631, filed Jan. 25, 2016, dated Oct. 2, 2017.
Applicant's Response to Non-Final Office action, U.S. Appl. No. 15/005,631, filed Jan. 25, 2016, dated Jan. 3, 2018.
Final Office action, U.S. Appl. No. 15/005,631, filed Jan. 25, 2016, dated Apr. 27, 2018.
Applicant's Response to Final Office action, U.S. Appl. No. 15/005,631, filed Jan. 25, 2016, dated Jun. 27, 2018.
Non-Final Office action, U.S. Appl. No. 15/005,631, filed Jan. 25, 2016, dated Jul. 25, 2018.
Applicant's Response to Non-Final Office action, U.S. Appl. No. 15/005,631, filed Jan. 25, 2016, dated Sep. 28, 2018.
Final Office action, U.S. Appl. No. 15/005,631, filed Jan. 25, 2016, dated Jan. 25, 2019.
Applicant's Response to Final Office action, U.S. Appl. No. 15/005,631, filed Jan. 25, 2016, dated Mar. 25, 2019.
Advisory Action, U.S. Appl. No. 15/005,631, filed Jan. 25, 2016, dated Apr. 24, 2019.
Applicant's Response to Advisory Action, U.S. Appl. No. 15/005,631, filed Jan. 25, 2016, dated Jul. 30, 2019.
Notice of Allowance, U.S. Appl. No. 15/005,631, filed Jan. 25, 2016, dated Aug. 21, 2019.
Applicant's 312 Amendment, U.S. Appl. No. 15/005,631, filed Jan. 25, 2016, dated Sep. 6, 2019.
Applicant's Request for Continued Examination (RCE), U.S. Appl. No. 15/005,631, filed Jan. 25, 2016, dated Nov. 15, 2019.
Non-Final Office action, U.S. Appl. No. 15/005,631, filed Jan. 25, 2016, dated Dec. 20, 2019.
Yash, "Using an Analog Accelerometer", maxEmbedded, p. 1 to p. 15; Published: Jun. 28, 2013.
Gadekar, et al., "Accelerometer In Mobile", Paripex—Indian Journal of Research, p. 148 to p. 150; Published Mar. 2013.
Yao et al., "Applying the ISO/IEEE 11073 Standards to Wearable Home Health Monitoring Systmens", Journal of Clinical Monitoring and Computing 2005, 19: 427-436, 2005.
IP.com, "Smartwatch—System and Method to Utilize Wearable Devices for Rating Capture", IP.com Disclosure No. 000232222, Publication Date Oct. 27, 2013.
IP.com, "Wearable and Physical Activity Triggered Device Lockinge", IP.com Disclosure No. 000241716, Publication Date May 26, 2015.
Jennifer Van Grove, 8 Fantastic Free Business Card Apps for the IPhone, printout on Nov. 10, 2015, available online at http://mashable.com/2009/05/09/iphone-business card-apps/, 7-pages, May 9, 2009.
Mell, Peter, et al., "The NIST Definition of Cloud Computing", NIST Special Publication 800-145, Sep. 2011, Gaithersburg, MD, 7 pages.
List of IBM Patent and/or Patent Applications treated as related, U.S. Appl. No. 16/690,356, filed Nov. 21, 2019, dated Dec. 27, 2019.

* cited by examiner

440

410 — DETECTING A FIRST PERSONAL ELECTRONIC DEVICE ASSOCIATED WITH A FIRST USER IN THE PRESENCE OF A SECOND PERSONAL ELECTRONIC DEVICE ASSOCIATED WITH A SECOND USER

420 — DETERMINING THE FIRST PERSONAL ELECTRONIC DEVICE IN THE PRESENCE OF THE SECOND PERSONAL ELECTRONIC DEVICE BEING ASSOCIATED WITH THE FIRST USER AND THE SECOND USER BEING IN A BUSINESS SETTING

460 — RECEIVING USER DATA REGARDING THE SECOND USER IN RESPONSE TO THE DETERMINATION OF THE FIRST USER AND THE SECOND USER BEING IN THE BUSINESS SETTING

480 — STORING THE RECEIVED USER DATA REGARDING THE SECOND USER IN A FIRST MEMORY FOR ACCESS BY THE FIRST USER ON THE FIRST PERSONAL ELECTRONIC DEVICE

*FIG. 6*

AUTOMATIC INFORMATION EXCHANGE BETWEEN PERSONAL ELECTRONIC DEVICES UPON DETERMINATION OF A BUSINESS SETTING

CROSS-REFERENCE TO RELATED PATENT

This application is a continuation of U.S. Pat. No. 10,764,356, issued Sep. 1, 2020, entitled, "Automatic Information Exchange Between Personal Electronic Devices Upon Determination of a Business Setting", which is incorporated by reference herein in its entirety.

TECHNICAL FIELD

The present disclosure relates generally to business contact information exchange, and more particularly, to methods, computer program products, and systems, for example, for automatic information exchange between personal electronic devices upon determination of users being in a business setting.

BACKGROUND

Personal electronic devices such as smartphone include a contact manager or software program that enables users to manually store and find contact information such as names, companies, addresses, and telephone numbers. During work, at meetings, while traveling, and other social interactions, business cards are often exchanged.

SUMMARY

Shortcomings of the prior art are overcome and additional advantages are provided through the provision, in one embodiment, of a method which includes, for example, detecting, by one or more processor, a first personal electronic device associated with a first user in the presence of a second personal electronic device associated with a second user, determining, by the one or more processor, the first personal electronic device in the presence of the second personal electronic device being associated with the first user and the second user being in a business setting, receiving, by the one or more processor, user data regarding the second user in response to the determination of the first user and the second user being in the business setting, and storing, by the one or more processor, the received user data regarding the second user in a first memory for access by the first user on the first personal electronic device.

In another embodiment, a computer program product is provided. The computer program product includes: a computer readable storage medium readable by one or more processing unit and storing instructions for execution by the one or more processor for performing a method which includes, for example, detecting a first personal electronic device associated with a first user in the presence of a second personal electronic device associated with a second user, determining the first personal electronic device in the presence of the second personal electronic device being associated with the first user and the second user being in a business setting, receiving user data regarding the second user in response to the determination of the first user and the second user being in the business setting, and storing the received user data regarding the second user in a first memory for access by the first user on the first personal electronic device.

In a further embodiment, a system is provided. The system includes: a memory; and one or more processor in communication with the memory, where the system is configured to perform a method which includes, for example, detecting a first personal electronic device associated with a first user in the presence of a second personal electronic device associated with a second user, determining the first personal electronic device in the presence of the second personal electronic device being associated with the first user and the second user being in a business setting, receiving user data regarding the second user in response to the determination of the first user and the second user being in the business setting, and storing the received user data regarding the second user in a first memory for access by the first user on the first personal electronic device.

Additional features and advantages are realized through the techniques set forth herein. Other embodiments are described in detail herein and are considered a part of the claimed invention.

BRIEF DESCRIPTION OF THE DRAWINGS

One or more embodiment of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 illustrates a flowchart of a method according to an embodiment as set forth herein;

DETAILED DESCRIPTION

Figure 1:
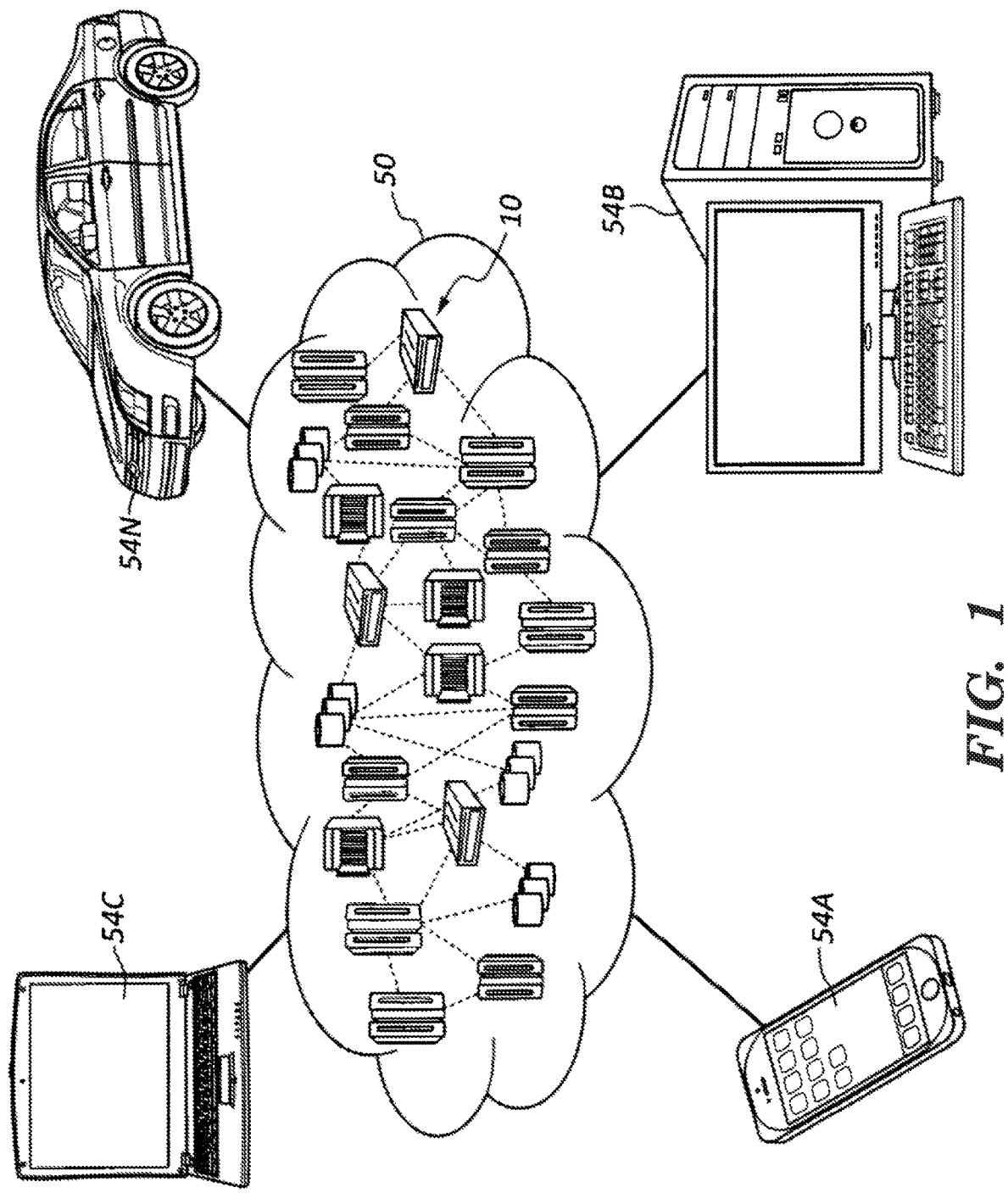
FIG. 1 depicts a cloud computing environment according to an embodiment as set forth herein.

Embodiments of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating embodiments of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software that may offer technical advantages including, for example, improving the efficiency and quality of information exchange between personal electronic devices upon determination of users being in a business setting and ensuring the quality of contact information databases and systems. The technique of the present disclosure may allow one or more personal electronic devices such as smart devices, smartphones, or smartwatches to automatically detect each other and selectively pass information back and forth ensuring comprehensiveness business contact based on the users of the personal electronic devices being in a business setting. As described in greater detail below, the users being in a business setting may be based on a determination of one or more factors including, but not limited to, the proximity of the users, whether a handshake was performed, the location and identity of the setting (e.g., company location as opposed to a bar, restaurant, party, on a bus, a train, or an airplane), amount of time spent together, whether the users' employers are working together on a project, a user's employment role, a user's calendar regarding meetings, whether the users already have each other's contact information, etc. Implementing the technique of the present invention may enhance the performance of receiving or exchanging contact information, thereby increasing the efficiency of contact information systems as a whole.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
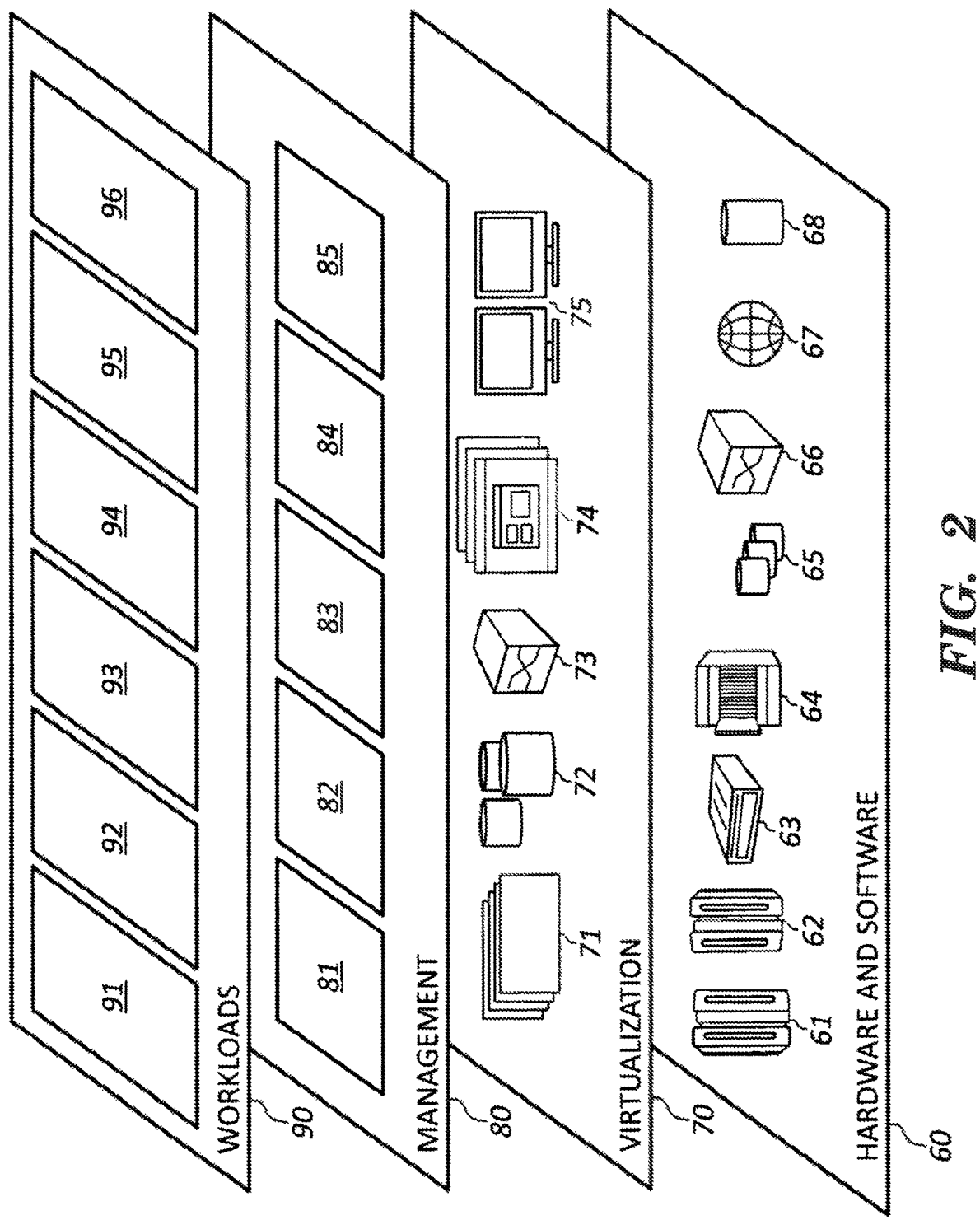
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information exchange control 96 as described herein.

Figure 3:
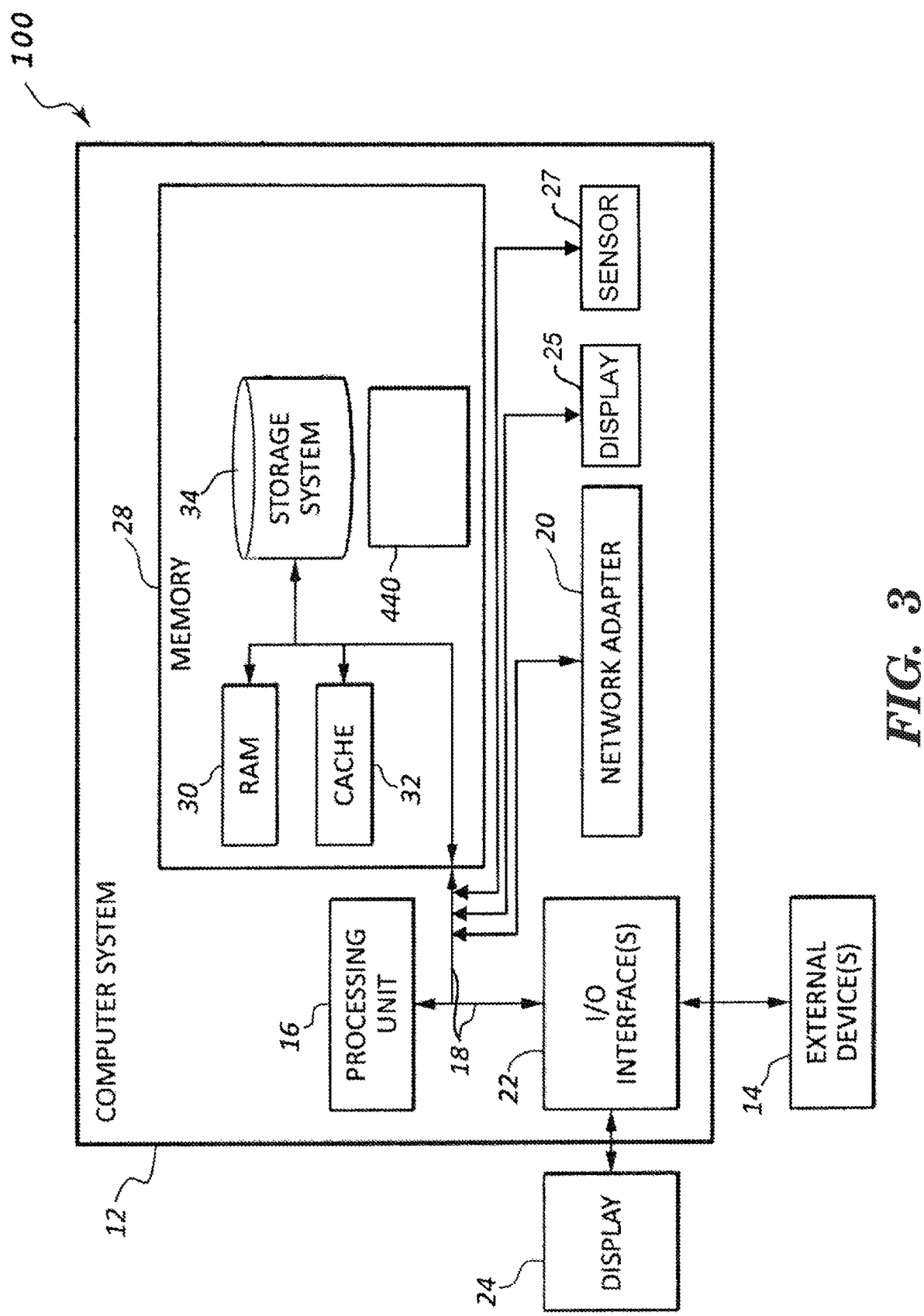
FIG. 3 depicts a hardware overview of a computing node, in accordance with an embodiment as set forth herein.

Referring now to FIG. 3, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In one embodiment, computing node 100 can be provided as a cloud computing node 10 of a cloud computing environment 50. In one embodiment, computing node 100 can be provided as a computing node of a computing environment other than a cloud computing environment.

In cloud computing node 100 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 12 in cloud computing node 100 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

One or more program 440, having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. One or more program 440 may generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

In addition to or in place of having external devices 14 and display 24, which can be configured to provide user interface functionality, computer system 12 of computing node 100 in one or more embodiments can include and display 25 connected to bus 18. Display 25 can be configured as a touch screen display and can be configured to provide user interface functionality. The computer system in one or more embodiments can also include one or more sensor device 27 connected to bus 18. One or more sensor device 27 can include a global positioning sensor (GPS) device, a radio receiver, a receiver/transmitter, and in one or more embodiments can be configured to provide a location of computing node 100 (e.g., for use in determining a geographic location of the personal electronic device and the user such as in an office building, bar, lecture hall, etc.). Sensor 27 may be one or more accelerometers (e.g., for use in determining if the personal electronic device is sitting at rest, or for use in determining whether users' gestures corresponds to or indicates the users engaging in a handshake within very close proximity).

A representative one or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
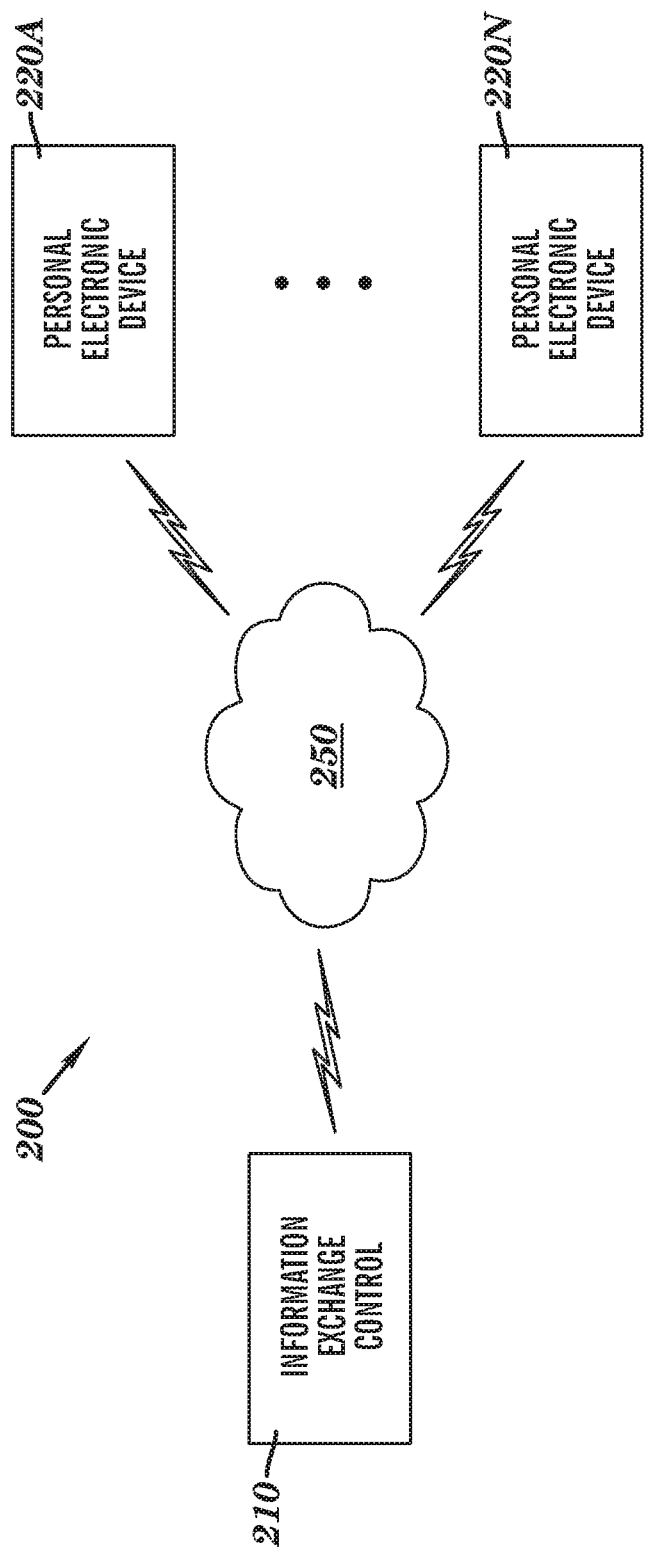
FIG. 4 is a block diagram of a system in accordance with an embodiment as set forth herein.

FIG. 4 is an exemplary block diagram of a system 200, according to one or more embodiments set forth herein. In the embodiment of FIG. 4, system 200 includes numerous devices, which may be or include one or more computing nodes 100 (FIG. 3) or computer systems 12 (FIG. 3) as previously described, connected by a network 250. For example, network 250 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4 depicts an example environment in which one or more electronic exchange control 210 (such as one or more computing node 100 (FIG. 3) or computer system 12 (FIG. 3)) may, for example, control exchange of user data such as contact information between a plurality of personal electronic devices. In one example, electronic exchange control 210 can be in communication with one or personal electronic devices 220A to 220N (such as one or more computing node 100 (FIG. 3) or computer system 12 (FIG. 3)). As described in greater detail below, electronic exchange control 210 may be effective for exchanging user data such as contact information between a first personal electronic device and a second personal electronic device. In some embodiments, information exchange control 210 may be, as shown in FIG. 4, in communication via network 250 with personal electronic devices 220A to 220N. In other embodiments, an information exchange control (or one or more programs operating thereon) may be separately disposed in personal electronic devices 220A to 220N. The personal electronic devices may be hand held devices such as mobile phones, smartphones, smartwatches, personal digital assistants (PDAs), tablet devices, laptop devices, internet devices, or other electronic devices or products, and may include a display screen.

Figure 5:
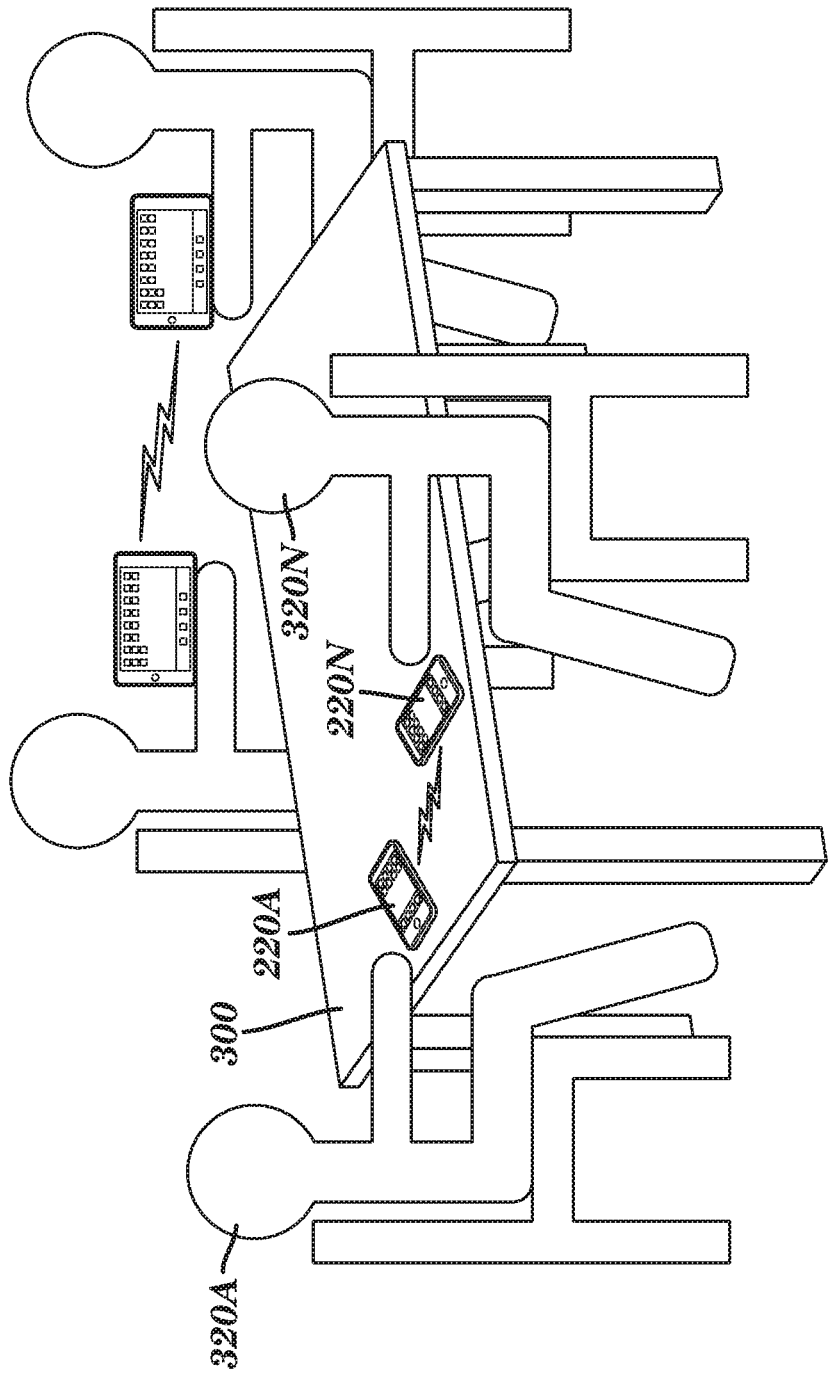
FIG. 5 is a diagrammatic illustration of a plurality of users having personal electronic devices according to an embodiment as set forth herein.

FIG. 5 is a diagrammatic illustration of a plurality of users 320A to 320N having personal electronic devices 220A to 220N. For example, plurality of users 320A to 320N having personal electronic devices 220A to 220N may be disposed such as on a table 300 or in a user's hand, and at a location 310 such as in a building or other business setting or location.

FIG. 6 illustrates a method, for example, for receiving information in connection with a personal electronic device in a business setting according to one or more embodiments of the present disclosure. By way of example, the method described with respect to FIG. 6 can be performed using one or more program 440 (FIG. 3) on one or more information exchange control 210 and/or on one or more personal electronic devices 220A to 220N, as detailed with respect to FIG. 4. For example, one or more program 440 may include at 410, detecting a first personal electronic device associated with a first user in the presence of a second personal electronic device associated with a second user, at 420 determining the first personal electronic device in the presence of the second personal electronic device being associated with the first user and the second user being in a business setting, at 460 receiving user data regarding the second user in response to the determination of the first user and the second user being in the business setting, and at 480 storing the received user data regarding the second user in a first memory for access by the first user on the first personal electronic device.

Figure 7:
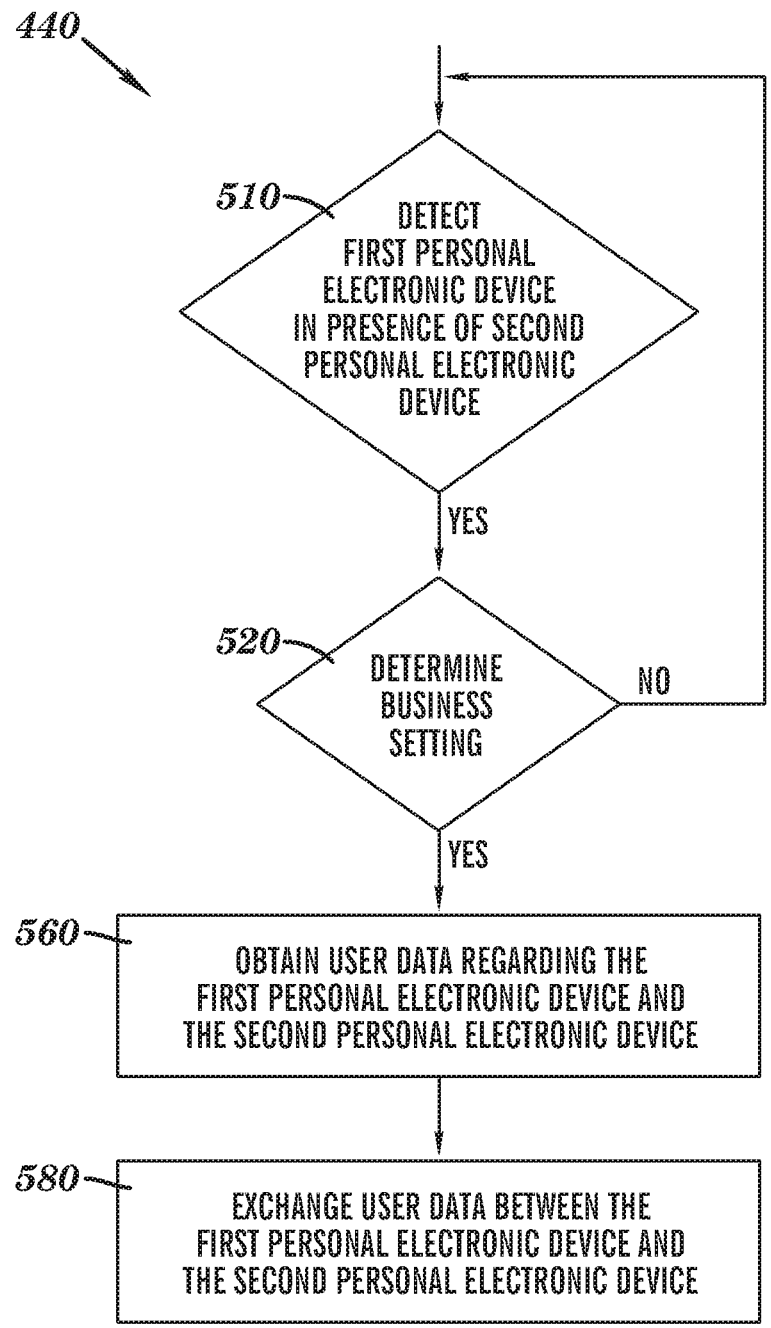
FIG. 7 illustrates a flowchart of a method according to an embodiment as set forth herein.

FIG. 7 illustrates a method, for example, for exchanging user data such as contact information between a first personal electronic device associated with a first user and a second personal electronic device associated with a second user in a business setting according to one or more embodiments of the present disclosure. By way of example, the processes described with respect to FIG. 7 can be performed using one or more program 440 (FIG. 3) on one or more information exchange control 210 and/or on one or more personal electronic devices 220A to 220N, as detailed with respect to FIG. 4.

For example, one or more program 440 may include at 510 detecting a first personal electronic device associated with a first user in the presence of a second personal electronic device associated with a second user, at 520 determining the first personal electronic device and the second personal electronic device being associated with the first user and the second user being in a business setting, at 560 obtaining contact data regarding the first personal electronic device and the second personal electronic device, and at 580 exchanging contact data between the first personal electronic device and the second personal electronic device.

With reference to FIGS. 6 and 7, detection and/or identification by the system of a first personal electronic device associated with a first user in the presence of a second personal electronic device associated with a second user may employ radio devices such as Bluetooth, WiFi, GPS, etc. technology implemented by one or more program 440 (FIG. 3) on one or more information exchange control 210 and/or on one or more personal electronic devices 220A to 220N, as detailed with respect to FIG. 4. Identification and/or detection by the system may be based on a proximity or a proximity range between the personal electronic devices, such as the personal electronic device being connectable to the same wireless local area network, or having a generally similar GPS location (e.g., three position coordinates at a particular time).

Determination by the system of the first personal electronic device and the second personal electronic device being associated with the first user and the second user being in a business setting may be based on one or more factors implemented by one or more program 440 (FIG. 3) on one or more information exchange control 210 and/or on one or more personal electronic devices 220A to 220N, as detailed with respect to FIG. 4. For example, such factors may include but are not limited to, determination that two users' personal electronic devices are in close proximity for X units of time (e.g., for about 10 minutes, about 20 minutes, etc.), determination that the personal electronic devices are at rest (e.g., not moving such as on a train, a plane, a vehicle, or a bus) over a period of time, determination that an exchange of contact information between the users has not been accepted or rejected in the past, determination of how many times the personal electronic devices have been within close proximity to each other. Determination may include retrying a plurality of times that the two users are deemed to be in a business setting or meeting together (e.g., if previously rejected). Such retrying may provide insight into the strength of the relationship between the users and whether the strength of the relationship changes over time.

Other factors for determination by the system may include whether the first personal electronic device and the second personal electronic device being associated with the first user and the second user are in a business setting may be based on a location. Classification of user current location may be based on GPS, WiFi (local area networks), cellular towers, or other suitable location technology. The determined location may be coordinated to a mapping database for identifying the address and of name and type of business residing at the location (e.g., company office, governmental office, residential owner of a home, etc.). If the user is in an office building, place of work, conference room, etc., business card sharing may be implemented. If a user is sitting in a common area, such as, a train station, a library, a restaurant, the determination may be that the location is not a business setting and prevent business card sharing. Further determination may be made on whether the user is moving or not. This is accomplished through the use of the accelerometer. If a user is riding on a train, the user may not want to receive notification of everybody's business card or information. Furthermore, and perhaps even more importantly, the user may not want his information to go out to just anybody on a train. A person knowledgeable in the art can appreciate that such defaults can be configured by software manufacturer.

Other factors for determination by the system may include whether the first personal electronic device and the second personal electronic device being associated with the first user and the second user being in a business setting may be based on the users or the company in which the users are employed. One or more embodiments may analyze the number of people at a location such as in a room and the ratio of the people by their company affiliation. For example, James and Craig may have metadata that ties them to Company A, while Peter, Amy, and Jennifer have metadata that ties them to Company B. This may improve the confidence for exchange of information or to prompt for exchange of digital contact information.

Other factors operable by the system for determining if the first personal electronic device and the second personal electronic device are associated with the first user and the second user being in a business setting may be based on calendar items. Such calendar items may be (stored in a database assessable via network 250 (FIG. 4) or on personal electronic devices 220A to 220N (FIG. 4). Determination may be based on words, terms, and/or phrases in the calendar items such as "meeting", "convention", etc. For example, machine intelligence may employ natural language processing that may parse the calendar entry for a given day or understand feeds of data from notes and calendars in order to classify the purpose for the users being at a location. In addition, an information exchange control and/or personal electronic device may be on the lookout for certain contacts that a user will be interacting with or meeting on a given date and/or time. This determination may be made based on the processing language in the subject and description of the calendar combined with an understanding of the people on the invite. For example, Robert's calendar may include an item indicating that he will be in meeting with a consulting group including James, Steven, and Jane (e.g., words indicating James will be traveling to the meeting as opposed to dialing into a conference call).

Another factors operable by the system for determining if the first personal electronic device and the second personal electronic device are associated with the first user and the second user being in a business setting may be based on a gesture such as a handshake between the users. For example, a handshake between users may be determined by monitoring movement along with distance measurement between the users (e.g., proximity between the personal electronic devices). Sensor 27 (FIG. 3) may include one or more accelerometers for use in determining whether the users' gestures corresponds to a gesture in the form of a handshake between the users. For example, this capability may be useful to smartwatches with sensors to understand the movement, and may include the smartwatch detecting and identifying gesture motion in combination with another electronic device being within about 1 foot or about 2 feet.

Receiving user data regarding the second user in response to a determination of the likelihood of the first user and the second user being in the business setting, and storing the received user data regarding the second user for access by the first user on the first personal electronic device may implemented by one or more program 440 on one or more information exchange control 210 and/or on one or more personal electronic devices 220A to 220N as detailed with respect to FIG. 4. For example, the user data may be digital information such as any business card information (e.g., first name, last name, company name, telephone number, and/or email address), and transferred via Bluetooth, WiFi, cellular telephone or other suitable communication networks. To improve the system, when a connection is made between the owners of two personal electronic devices, the system may note the identification of the personal electronic device (for example MAC id) of the device radio used to make the connection. For example, if Bluetooth was the radio that was used for the exchange of business card information, the Bluetooth radio MAC id would may be noted. This may prevent the system from trying to connect the same two people again and reduce the computational load on the system. Metadata may be logged as to the history of the connection such as when and where it occurred, information if obtained, etc.

In one or more embodiments, the system may link or establish a connection between two parties on social media sites such as LinkedIn. In one or more embodiments, a user may look up addition information (in addition to the automatically received or exchanged contact information) on the user and accept or reject the additional information.

Other factors of the present technique may include each of the capabilities discussed above being set up or configured ahead of time such as by a user configuring or setting up a personal electronic device. For example, a user may have the option of turning on and off the ability to automatically receive contact information, adjust the proximity range and/or time period required within a proximity range, turn on or off the gesture capability, turn on or off whether the personal electronic device notifies the user of repeat requests, set how often that repeat notification may take place, adjust whether override identifying a business location or non-business location, configure filters by varying artifacts of a contact record, such as role (e.g., only want to exchange business card with IT architects, and may include that the filters can black and/or white list).

Further factors of the present technique may include a learning capability based on historical occurrences such as when the users are most likely to connect and interact with each other in a business setting and who are the most likely to respond to a connection request. Attributes may be captured about users that connect with other users, for example, users from Acme Labs are likely to connect with users from Acme Corp. Attributes may be captured specific to a user. For example, if a user turns down connecting with sales people, the system may not prompt for connecting and electronically sharing contact information with sales people.

Further factors of the present technique may include the system determining if a connection between the parties has or has not been accepted or rejected in the past. If previously accepted, there is no need to alert the user. If previously rejected, a user might not be alerted again, or to show notification every fifth time the user is in proximity with the user for more than 15 minutes etc.

Figure 8:
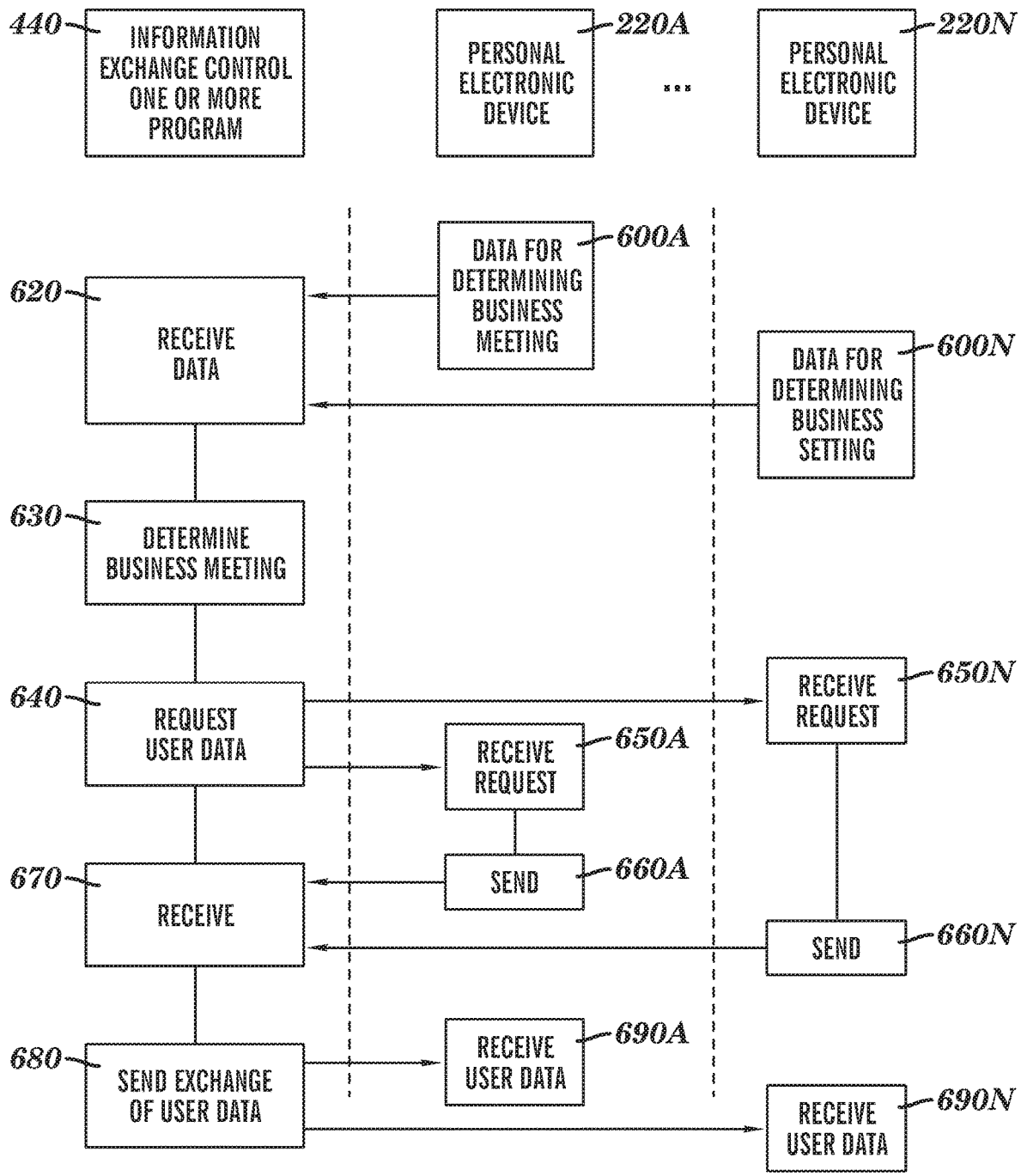
FIG. 8 is a diagram illustrating an embodiment of a process in accordance with an embodiment as set forth herein.

FIG. 8 is a diagram illustrating further processes, for example, for controlling exchange of information in connection with a user with a personal electronic device in a business setting according to one or more embodiments as set forth herein. By way of explanation, in FIG. 8, processes are illustrated from the point of view of an information exchange control one or more program 440 (e.g., information exchange control one or more programs 440 running on information exchange control 210 of FIG. 4), personal electronic device 220A to personal electronic device 220N (e.g., such as personal electronic device 220A to personal electronic device 220N of FIG. 4).

In one or more embodiments, one or more program 440 may run on a different collection of physical or virtual machines or processors, depending on the need for scalability of the system. In one specific example, one or more program 440 could run on a single multiprocessor server system. In another specific example, various portions of one or more program 440 may run on different processors running on different computing nodes or systems, e.g., on each of personal electronic device 220A to personal electronic device 220N.

By way of overview, FIG. 8 illustrates, at least in part, one or more embodiments for controlling exchange of user data such as contact information in connection with a user having a personal electronic device in a business setting. It will be understood that based on a different set or order of inputs one or more program 440 can provide different functionality than the functionality described with reference to FIG. 8.

Initially, data for determine a business meeting at blocks 600A to 600N may be sent from personal electronic device 220A to personal electronic device 220N, respectively, to information exchange control program 440 at block 620. Such information may be location, time, gestures, etc. as described above. At block 630, information exchange control program 440 may determine whether two or more personal electronic devices are in a business meeting, and if so, at block 640, request user data such as contact information from such personal electronic devices, for example, at blocks 650A and 650N, which user data is sent at blocks 660A and 660N, and received at information exchange control program 440 at block 670. Information exchange control program 440 at block 680 may forward user data such as contact information associated with personal electronic device 220N to personal electronic device 220A for storage in a memory (e.g., in a memory 28 of computer note 100 or computer system 12 of FIG. 3) at block 690A, and forward user data such as contact information associated with personal electronic device 220A to personal electronic device 220N for storage in a memory (e.g., in a memory 28 of computer note 100 or computer system 12 of FIG. 3) at block 690N.

As will be appreciated from the description above, the technique of the present disclosure allows determining whether or not to pass business card type information to personal electronic devices of other people within a set proximity range depending on various factors. The technique may include other features that may be configurable by a user so each user could decide how often and under what circumstances that they prefer to receive or exchange information. Such a technique overcomes the problem of exchanging physical business cards or having to later look up someone on a company website or on Linked-in by providing an automatic exchanging contact information upon the parties being in a business setting.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the present disclosure and the practical application, and to enable others of ordinary skill in the art to understand the present disclosure as described herein for various embodiments with various modifications as are suited to the particular use contemplated.

The invention claimed is:

1. A computer implemented method comprising:
    detecting a first personal electronic device in the presence of a second personal electronic device, wherein the first personal electronic device is associated to a first user, wherein the second personal electronic device is associated to a second user;
    determining that the first user and the second user are in a business setting;
    receiving user data of the second user in response to the determining that the first user and the second user are in the business setting; and
    storing the received user data of the second user in a first memory for access by the first user, wherein the determining that the first user and the second user are in a business setting includes determining based on an examining of data that there are currently a plurality of persons affiliated with a first enterprise of the first user, and currently a plurality of persons affiliated with a second enterprise of the second user, at a common location.

2. The computer implemented method of claim 1, wherein the determining that the first user and the second user are in a business setting includes using a mapping database that maps locations to uses of locations and wherein the determining includes determining using the mapping database that the location is a business office location.

3. The computer implemented method of claim 1, further comprising;
    receiving user data of the first user in response to the determining that the first user and the second user are in a business setting, and storing the user data of the first user in a second memory for access by the second user.

4. The computer implemented method of claim 1, further comprising;
    receiving user data of the first user in response to the determining that the first user and the second user are in a business setting, and storing the user data of the first user in a second memory for access by the second user, wherein the first memory is located on the first personal electronic device, wherein the second memory is located on the second personal electronic device.

5. The computer implemented method of claim 1, wherein the determining that the first user and the second user are in a business setting is performed by a computing node external from the first personal electronic device and the second personal electronic device, wherein the method includes the computing node, in response to the determining that the first user and the second user are in a business setting, requesting and receiving the user data of the second user from the second personal electronic device, and wherein the storing the received user data of the second user in the first memory includes storing the received user data of the second user on the first personal electronic device.

6. The computer implemented method of claim 1, wherein the determining that the first user and the second user are in a business setting comprises determining motion characteristics of the first personal electronic device, and wherein the determining comprises determining a handshake between the first user and the second user based on the motion characteristics of the first personal electronic device.

7. The computer implemented method of claim 1, wherein the determining that the first user and the second user are in a business setting comprises;
    determining motion characteristics of the first personal electronic device, and wherein the determining comprises:
        determining a handshake between the first user and the second user based on the motion characteristics of the first personal electronic device, wherein ascertaining of the motion characteristics of the first personal electronic device includes using an output of an accelerometer of the first personal electronic device, and wherein the determining a handshake between the first user and the second user based on the motion characteristics of the first personal electronic device includes determining, using an output of the accelerometer, that a first user's gesture corresponds to a gesture in form of a handshake between users.

8. The computer implemented method of claim 1, wherein the determining that the first user and the second user are in a business setting comprises:
    determining an amount of time of the first personal electronic device associated with a first user being at rest and being in the presence of a second personal electronic device associated with a second user.

9. The computer implemented method of claim 1, wherein the determining that the first user and the second user are in a business setting is in dependence on an examining of historical data indicating that the first user and the second user have been in close proximity with one another multiple times in the past.

10. A computer implemented method comprising:
    detecting a first personal electronic device in the presence of a second personal electronic device, wherein the first personal electronic device is associated to a first user, wherein the second personal electronic device is associated to a second user;

determining that the first user and the second user are in a business setting;

receiving user data of the second user in response to the determining that the first user and the second user are in the business setting; and storing the received user data of the second user in a first memory for access by the first user, wherein the method is further characterized by one or more of the following selected from the group consisting of: (a) the determining that the first user and the second user are in a business setting includes determining based on an examining of data that there are currently a plurality of persons affiliated with a first enterprise of the first user, and currently a plurality of persons affiliated with a second enterprise of the second user, at a common location; (b) the method further includes preventing sharing of data between the first user and the second user in response to the determination that a location occupied by the first user and the second user is occupied by less than two persons affiliated with a first enterprise of the first user, and less than two persons affiliated with a second enterprise of the second user; and (c) the determining that the first user and the second user are in a business setting is in dependence on a determining of the number of persons affiliated with a first enterprise of the first user currently at a location, and in dependence on an ascertaining of the number of persons affiliated with a second enterprise of the second user currently at the location.

11. The computer implemented method of claim 10, wherein the determining that the first user and the second user are in a business setting includes determining based on an examining of data that there are currently a plurality of persons affiliated with a first enterprise of the first user, and currently a plurality of persons affiliated with a second enterprise of the second user, at a common location.

12. The computer implemented method of claim 10, wherein the method further includes preventing sharing of data between the first user and the second user in response to the determination that a location occupied by the first user and the second user is occupied by less than two persons affiliated with a first enterprise of the first user, and less than two persons affiliated with a second enterprise of the second user.

13. The computer implemented method of claim 10, wherein the determining that the first user and the second user are in a business setting is in dependence on a determining of the number of persons affiliated with a first enterprise of the first user currently at a location, and in dependence on an ascertaining of the number of persons affiliated with a second enterprise of the second user currently at the location.

14. A computer implemented method comprising:

detecting a first personal electronic device in the presence of a second personal electronic device, wherein the first personal electronic device is associated to a first user, wherein the second personal electronic device is associated to a second user;

determining that the first user and the second user are in a business setting;

receiving user data of the second user in response to the determining that the first user and the second user are in the business setting; and storing the received user data of the second user in a first memory for access by the first user, wherein the determining that the first user and the second user are in a business setting is in dependence on a determining of the number of persons affiliated with a first enterprise of the first user currently at a location, and in dependence on an ascertaining of the number of persons affiliated with a second enterprise of the second user currently at the location.

15. The computer implemented method of claim 14, wherein the determining that the first user and the second user are in a business setting includes using a mapping database that maps locations to uses of locations and wherein the determining includes determining using the mapping database that the location is a business office location.

16. The computer implemented method of claim 14, further comprising;

receiving user data of the first user in response to the determining that the first user and the second user are in a business setting, and storing the user data of the first user in a second memory for access by the second user.

17. The computer implemented method of claim 14, further comprising;

receiving user data of the first user in response to the determining that the first user and the second user are in a business setting, and storing the user data of the first user in a second memory for access by the second user, wherein the first memory is located on the first personal electronic device, wherein the second memory is located on the second personal electronic device.

18. The computer implemented method of claim 14, wherein the determining that the first user and the second user are in a business setting is performed by a computing node external from the first personal electronic device and the second personal electronic device, wherein the method includes the computing node, in response to the determining that the first user and the second user are in a business setting, requesting and receiving the user data of the second user from the second personal electronic device, and wherein the storing the received user data of the second user in the first memory includes storing the received user data of the second user on the first personal electronic device.

19. The computer implemented method of claim 14, wherein the determining that the first user and the second user are in a business setting comprises determining motion characteristics of the first personal electronic device, and wherein the determining comprises determining a handshake between the first user and the second user based on the motion characteristics of the first personal electronic device.

20. The computer implemented method of claim 14, wherein the determining that the first user and the second user are in a business setting comprises:

determining motion characteristics of the first personal electronic device, and wherein the determining comprises:

determining a handshake between the first user and the second user based on the motion characteristics of the first personal electronic device, wherein ascertaining of the motion characteristics of the first personal electronic device includes using an output of an accelerometer of the first personal electronic device, and wherein the determining a handshake between the first user and the second user based on the motion characteristics of the first personal electronic device includes determining, using an output of the accelerometer, that a first user's gesture corresponds to a gesture in form of a handshake between users.

\* \* \* \* \*